United States Patent
Jung et al.

(10) Patent No.: US 9,185,547 B2
(45) Date of Patent: Nov. 10, 2015

(54) SYSTEM AND METHOD FOR RECEIVING CALL IN WIRELESS TERMINAL

(75) Inventors: In-Hyung Jung, Gyeongsangbuk-do (KR); Hee-Jung Jung, Busan (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 560 days.

(21) Appl. No.: 13/606,437

(22) Filed: Sep. 7, 2012

(65) Prior Publication Data
US 2013/0065570 A1 Mar. 14, 2013

(30) Foreign Application Priority Data
Sep. 8, 2011 (KR) .......................... 10-2011-0090965

(51) Int. Cl.
| | |
|---|---|
| H04M 3/42 | (2006.01) |
| H04W 8/20 | (2009.01) |
| H04W 4/16 | (2009.01) |
| H04W 4/00 | (2009.01) |
| H04W 76/02 | (2009.01) |
| H04W 68/00 | (2009.01) |

(52) U.S. Cl.
CPC .............. H04W 8/205 (2013.01); H04W 4/003 (2013.01); H04W 4/16 (2013.01); H04W 68/005 (2013.01); H04W 76/025 (2013.01)

(58) Field of Classification Search
CPC ....... H04W 4/003; H04W 4/16; H04W 8/205; H04W 68/005; H04W 76/025; H04W 8/183; H04W 12/06; H04W 88/02; H04W 88/06; H04W 8/12; H04W 92/02; H04W 92/14; H03G 3/3073; H03G 3/3078; H04L 63/0853

USPC ......... 455/417, 558, 411, 407, 406, 557, 555, 455/414.1; 379/357.01, 114.17
See application file for complete search history.

(56) References Cited

U.S. PATENT DOCUMENTS

| | | | | |
|---|---|---|---|---|
| 7,336,941 | B1 * | 2/2008 | Clingerman et al. | 455/404.1 |
| 2004/0023689 | A1 * | 2/2004 | Ahonen | 455/558 |
| 2008/0064443 | A1 * | 3/2008 | Shin et al. | 455/558 |
| 2010/0255880 | A1 * | 10/2010 | Huang et al. | 455/558 |
| 2011/0012987 | A1 * | 1/2011 | Yoon | 348/14.02 |
| 2012/0135715 | A1 * | 5/2012 | Kang et al. | 455/412.1 |
| 2014/0051398 | A1 * | 2/2014 | Ben Shlush et al. | 455/411 |

FOREIGN PATENT DOCUMENTS

WO 2010/140781 A2 12/2010

* cited by examiner

Primary Examiner — Mahendra Patel
(74) Attorney, Agent, or Firm — Cha & Reiter, LLC.

(57) ABSTRACT

A system and method for receiving a call in a wireless terminal having a single Radio Frequency (RF) unit and at least two Subscriber Identity Module (SIM) cards, wherein the system includes: the wireless terminal for informing a user of occurrence of an incoming call through a second SIM card for which an incoming call forwarding is pre-registered while performing a call through a first SIM card; a Base Station (BS) related to the first SIM card for informing the wireless terminal of the occurrence of the incoming call through the second SIM card, in response to a paging request for the second SIM card that is received from a BS related to the second SIM card; and the BS related to the second SIM card for requesting the BS related to the first SIM card for paging to the second SIM card if a call request to the second SIM card for which the incoming call forwarding is registered is received.

15 Claims, 2 Drawing Sheets

# SYSTEM AND METHOD FOR RECEIVING CALL IN WIRELESS TERMINAL

CLAIM OF PRIORITY

This application claims priority under 35 U.S.C. §119(a) to a Korean Patent Application filed in the Korean Intellectual Property Office on Sep. 8, 2011 and assigned Serial No. 10-2011-0090965, the contents of which are incorporated herein by reference.

BACKGROUND OF THE INVENTION

1. Field of the Invention

The present invention relates generally to a system and method for receiving a call in a wireless terminal, and more particularly, to a system and method for receiving a call in a wireless terminal having a single Radio Frequency (RF) unit and at least two Subscriber Identity Module (SIM) cards

2. Description of the Related Art

Although wireless terminals equipped with a single SIM card are popularly used, wireless terminals equipped with two SIM cards have also been recently introduced to enable the user to use two telephone numbers with a single wireless terminal. When two RF units are included in a wireless terminal for two SIM cards, the wireless terminal may receive a call through one SIM card while performing another call through the other SIM card.

However, the wireless terminal equipped with two RF units may inevitably cause the cost and power consumption problems. To solve these problems, an alternative wireless terminal includes a single RF unit and offers a communication service to two SIM cards, via time sharing scheme, has been proposed.

However, there have been technical difficulties in such a terminal to successfully receive a call through one SIM card while performing another call through the other SIM card with a single RF unit. That is, when two SIM cards performs a communication using one RF unit, one SIM card cannot use the RF unit when the other SIM card currently uses the RF unit.

SUMMARY OF THE INVENTION

An aspect of the present invention is to provide a system and method for receiving a call in a wireless terminal including a single Radio Frequency (RF) unit and at least two Subscriber Identity Module (SIM) cards, which can receive a requested call through one SIM card while performing another call through another SIM card.

According to one aspect of the present invention, there is provided a system for receiving a call in a wireless terminal including a single Radio Frequency (RF) unit and at least two Subscriber Identity Module (SIM) cards, including: the wireless terminal for informing a user of occurrence of an incoming call through a second SIM card for which incoming call forwarding is registered while performing a call through a first SIM card; a Base Station (BS) related to the first SIM card for informing the wireless terminal performing the call of the occurrence of the incoming call through the second SIM card, in response to a paging request for the second SIM card that is received from a BS related to the second SIM card; and the BS related to the second SIM card for requesting the BS related to the first SIM card for paging to the second SIM card if a call request to the second SIM card for which the incoming call forwarding is registered is received.

According to another aspect of the present invention, there is provided a method of receiving a call in a wireless terminal including a single Radio Frequency (RF) unit and at least two Subscriber Identity Module (SIM) cards, including: if a call request to a second SIM card for which incoming call forwarding is registered is received to a Base Station (BS) related to the second SIM card while the wireless terminal is performing a call through a first SIM card, requesting, by the BS related to the second SIM card, a BS related to the first SIM card for paging to the second SIM card; and if occurrence of an incoming call through the second SIM card is received from the BS related to the first SIM card, informing, by the wireless terminal, a user of the occurrence of an incoming call through the second SIM card while performing the call through the first SIM card.

According to yet another aspect of the present invention, there is a provided a terminal for processing a call which includes: a single Radio Frequency (RF) unit for receiving an incoming call; a first Subscriber Identity Module (SIM) card and a second Subscriber Identity Module (SIM) card; and a controller for establishing a call connection to a first terminal in communication with a first base station via the first SIM card and for transmitting an incoming call forwarding pre-registration to a second base station in communication with a second terminal, wherein upon receiving an incoming call request from the second terminal through the second SIM card, the second base station extracts information regarding the first SIM card from the pre-registration and requests a paging the first base station to request the first base station to inform the first wireless terminal of the incoming call request, and thereafter the first base station holds the communication with the first terminal and forwards a voice signal of the second terminal received from the second base station to the first wireless terminal.

BRIEF DESCRIPTION OF THE DRAWINGS

The above features and advantages of the present invention will become more apparent from the following detailed description when taken in conjunction with the accompanying drawing in which.

DETAILED DESCRIPTION

Preferred embodiments of the present invention will be described herein below with reference to the accompanying drawings.

Figure 1:
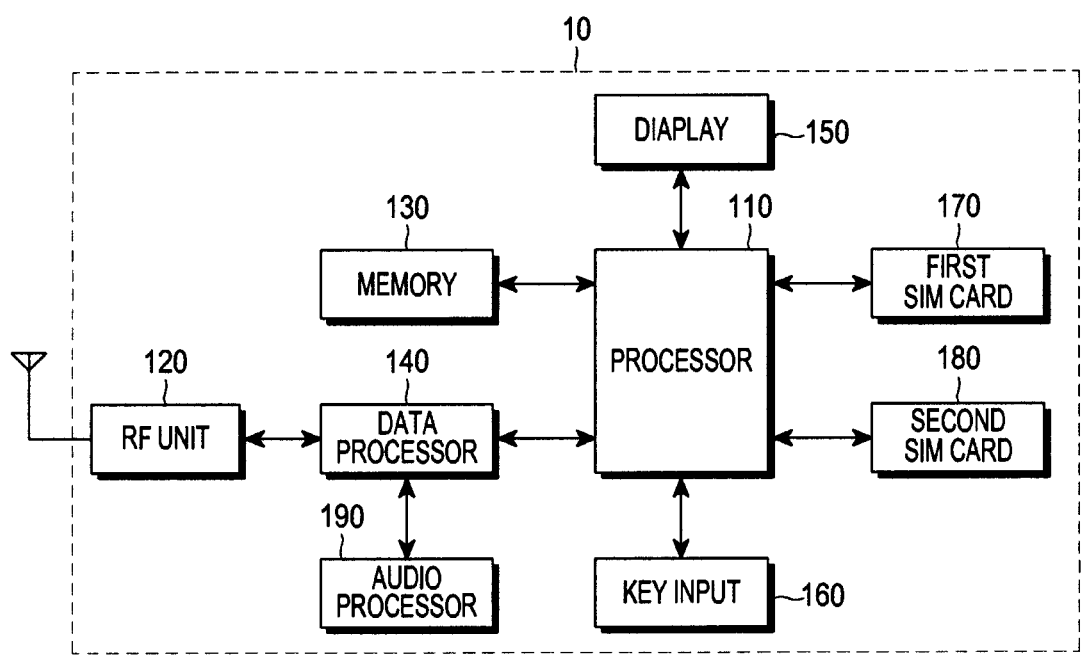
FIG. 1 is a diagram illustrating a dual SIM card terminal according to an exemplary embodiment of the present invention.

FIG. 1 is a diagram illustrating a dual SIM card terminal according to an exemplary embodiment of the present invention.

Referring to FIG. 1, an RF unit 120 performs a wireless communication function of the dual SIM card terminal and includes an RF transmitter for up-converting and amplifying a frequency of a transmitted signal and an RF receiver for low-noise amplifying a received signal and down-converting a frequency. A data processor 140 includes a transmitter for encoding and modulating the transmitted signal and a receiver for demodulating and decoding the received signal. That is, the data processor 140 can be formed with a modem and a codec. Here, the codec includes a data codec for processing packet data, etc. and an audio codec for processing an audio signal, such as voice. An audio processor 190 reproduces a received audio signal output from the audio codec of the data processor 140 or transmits a transmitted audio signal generated in a microphone to the audio codec of the data processor 120. A key input unit 160 includes keys for inputting numbers and character information and functional keys for setting various functions.

A memory 130 can be formed with a program memory and a data memory. The program memory can store programs for controlling the general operations of the dual SIM card terminal and programs for making a control so that the dual SIM cards perform a signaling through a single identical channel for the registration to the network during an idle state of the dual SIM terminal.

The first SIM card 170 and the second SIM card 180 are the card-type modules and store personal information so as to provide various services, such as the subscriber identification, charging, and the security function. Each of the first SIM card 170 and the second SIM card 180 stores a unique telephone number.

The display unit 150 displays user data output from the controller 110. Here, the display unit 150 can be an LCD, and in this case, the display unit 150 can include an LCD controller, a memory capable of storing image data, and an LCD display device. Here, when the LCD is implemented in a touch screen scheme, the LCD can function as an input unit. In this regard, the display unit 150 can display keys, such as the keys included in the input unit 160.

A controller 110 controls the general operations of the dual SIM card terminal.

Figure 2:
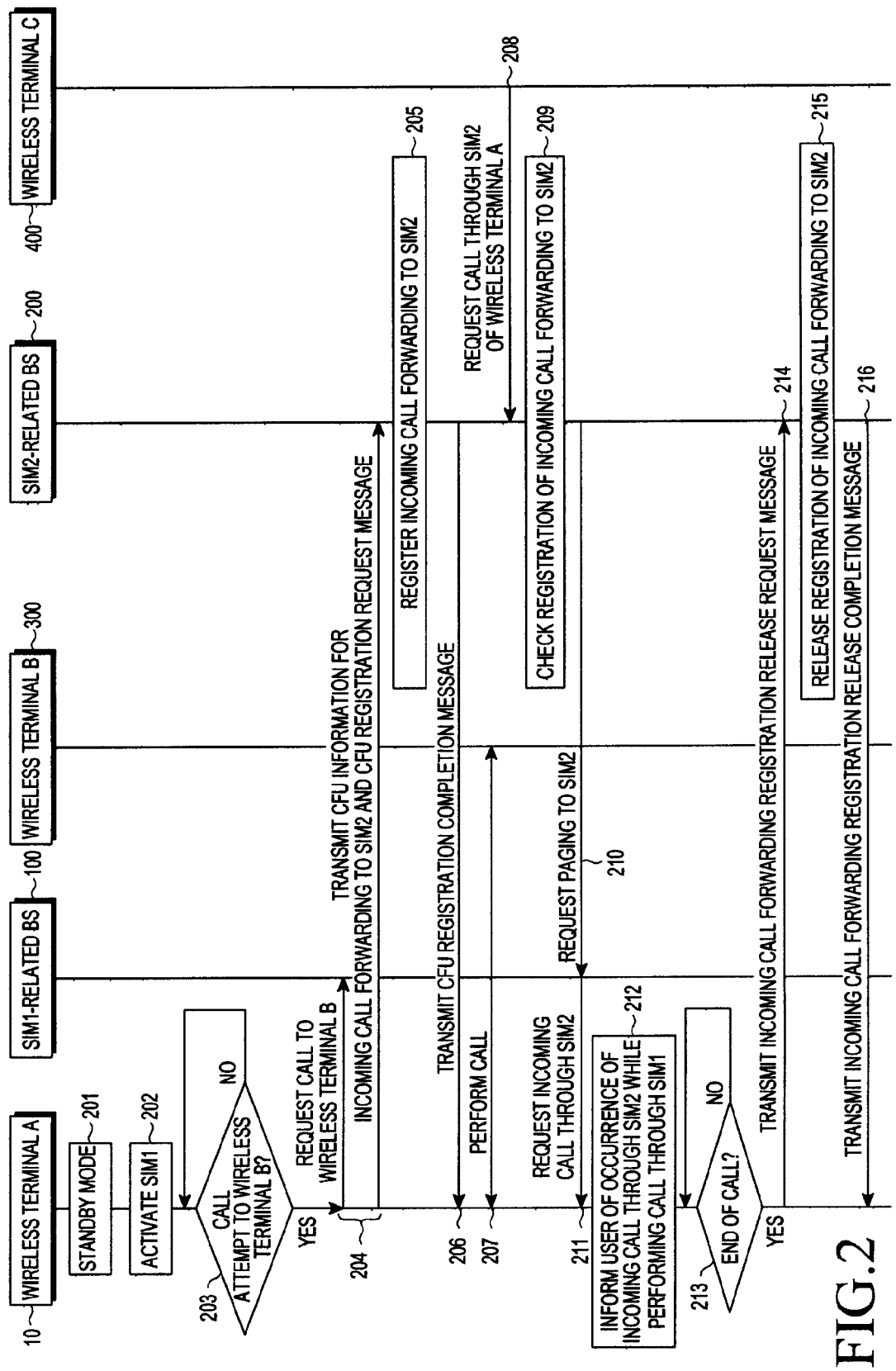
FIG. 2 illustrates call reception in a wireless terminal including a single RF unit and at least two SIM cards according to an embodiment of the present invention.

FIG. 2 illustrates call reception in a wireless terminal A including a single RF unit and at least two SIM cards according to an embodiment of the present invention.

Referring to FIG. 2, the wireless terminal A includes the single RF unit 120 and first and second SIM cards SIM1 170 and SIM2 180 for performing a communication service with the single RF unit 120 in a time sharing manner. When a user selects the first SIM card SIM1 in step 201 (corresponding to a standby mode of the wireless terminal A) in which the first and second SIM cards SIM1 and SIM2 are linked to their communication networks, the first SIM card SIM1 is activated in step 202. When the user attempts to send a call from the wireless terminal A to a wireless terminal B, the wireless terminal A detects the attempt by the user in step 203, and requests a Base Station (BS) 100 related to the activated first SIM card SIM1 for a call connection to the wireless terminal B in step 204.

At the same time, the wireless terminal A transmits Control Forwarding Unconditional (CFU) information for incoming call forwarding to the second SIM card SIM2 and a CFU registration request message, to a BS 200 related to the second SIM card SIM2. A call forwarding means to forward the call to a registered number if the call is coming Therefore, "incoming call forwarding" is to forward the call to a number of the first SIM card, if the call is coming by the number of the SIM2.

The CFU information includes information regarding the first SIM card SIM1 from which the incoming call forwarding to the second SIM card SIM2 is performed when a call request to the second SIM card SIM2 is received and a communication service type (voice, short message, or facsimile) for the incoming call forwarding.

Accordingly, incoming call forwarding for various communication services may be performed according to the communication service type set in the CFU information.

If the CFU information for incoming call forwarding to the second SIM card SIM2 and the CFU registration request message are received from the wireless terminal A, the BS 200 related to the second SIM card SIM2 registers the received CFU information as information regarding the incoming call forwarding to the second SIM card SIM2 in step 205.

If the incoming call forwarding to the second SIM card SIM2 is registered, the BS 200 related to the second SIM card SIM2 transmits, to the wireless terminal A, an incoming call forwarding registration completion message indicating that the incoming call forwarding to the second SIM card SIM2 has been registered, in step 206.

While the BS 200 related to the second SIM card SIM2 is registering the incoming call forwarding to the second SIM card SIM2 in response to the request of the wireless terminal A, the wireless terminal A may connect and perform a call with the wireless terminal B via the BS 100 related to the first SIM card SIM1 in step 207.

While the wireless terminal A is performing the call with the wireless terminal B via the BS 100 related to the first SIM card SIM1 in step 207, if a wireless terminal C requests a call through the second SIM card SIM2 of the wireless terminal A via the BS 200 related to the second SIM card SIM2 in step 208, the BS 200 related to the second SIM card SIM2 checks in step 209 that the incoming call forwarding to the second SIM card SIM2 has been registered. In step 210, the BS 200 related to the second SIM card SIM2 extracts the information regarding the first SIM card SIM1 from the registered CFU information and requests the BS 100 related to the first SIM card SIM1 for paging to the second SIM card SIM2 to inform the wireless terminal A of the occurrence of an incoming call.

Upon receiving the paging request for the second SIM card SIM2 from the BS 200 related to the second SIM card SIM2, the BS 100 related to the first SIM card SIM1 informs the wireless terminal A performing the performing the call with the wireless terminal B of the occurrence of an incoming call through the second SIM card SIM2 in step 211.

Upon receiving the occurrence of an incoming call through the second SIM card SIM2 from the BS 100 related to the first SIM card SIM1, the wireless terminal A performing the performing the call with the wireless terminal B informs the user of the occurrence of an incoming call through the second SIM card SIM2 in step 212.

If the user selects a call through the second SIM card SIM2 in response to the incoming call through the second SIM card SIM2, the BS 100 related to the first SIM card SIM1 holds off the call with the wireless terminal B and transmits a voice signal of a user of the wireless terminal C, which is received from the BS 200 related to the second SIM card SIM2, to the wireless terminal A to allow the wireless terminal A to perform a call with the wireless terminal C.

If the wireless terminal A ends all the calls, the wireless terminal A detects the end of calls in step 213, and transmits, to the BS 200 related to the second SIM card SIM2, an incoming call forwarding registration release request message for requesting to release the incoming call forwarding registration to the second SIM card SIM2, in step 214.

Upon receiving the incoming call forwarding registration release request message from the wireless terminal A, the BS 200 related to the second SIM card SIM2 releases the incoming call forwarding registration for the second SIM card SIM2 in step 215, and transmits, to the wireless terminal A, an incoming call forwarding registration release completion message indicating that the registration of the incoming call forwarding to the second SIM card SIM2 has been released, in step 216.

The operation of receiving a call requested through the second SIM card SIM2 while the wireless terminal A is performing a call through the first SIM card SIM1 by registering incoming call forwarding to the second SIM card SIM2 as shown in FIG. 1 may be achieved by setting a menu of the wireless terminal A.

As is apparent from the foregoing description, by providing a system and method for receiving a call in a wireless terminal including a single RF unit and at least two SIM cards, the wireless terminal including a single RF unit can receive an incoming call through one SIM card while performing another call through another SIM card.

The above-described methods according to the present invention can be implemented in hardware, firmware or as software or computer code that can be stored in a recording medium such as a CD ROM, an RAM, a floppy disk, a hard disk, or a magneto-optical disk or computer code downloaded over a network originally stored on a remote recording medium or a non-transitory machine readable medium and to be stored on a local recording medium, so that the methods described herein can be rendered in such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

While the invention has been shown and described with reference to certain exemplary embodiments, such as a wireless terminal, thereof, it will be understood by those skilled in the art that various changes in form and details may be made therein without departing from the spirit and scope of the invention as defined by the appended claims and their equivalents.

What is claimed is:

1. A system for receiving a call, the system comprising:
   a wireless terminal having a single Radio Frequency (RF) device and at least a first Subscriber Identity Module (SIM) card and a second Subscriber Identity Module (SIM) card; and
   a Base Station (BS) related to the first SIM card for informing the wireless terminal of an incoming call request for the second SIM card in response to a paging request for the second SIM card that is received from a BS related to the second SIM card, while the wireless terminal is performing a call through the first SIM card, wherein;
   if both of the calls end, the wireless terminal transmits, to the BS related to the second SIM card, an incoming call forwarding registration release request message for requesting a release of an incoming call forwarding registration.

2. The system of claim 1, wherein, if the incoming call is requested in a state where the first SIM card is activated, the wireless terminal requests the BS related to the first SIM card for the call and simultaneously requests the BS related to the second SIM card for registration of incoming call forwarding, and if the incoming call through the second SIM card is received from the BS related to the second SIM card while the wireless terminal is performing the call connection via the BS related to the first SIM card, the wireless terminal informs a user of the incoming call.

3. The system of claim 1, wherein, if the incoming call is established while the wireless terminal is performing the call connection through the first SIM card, the wireless terminal holds off the call connection through the first SIM card and receives a voice signal from the BS related to the second SIM card.

4. The system of claim 1, wherein the wireless terminal transmits Call Forwarding Unconditional (CFU) information in which information regarding the first SIM card is included and a CFU registration request message to the BS related to the second SIM card in order to register the incoming call forwarding registration for the second SIM card.

5. The system of claim 4, wherein, if CFU information and a CFU registration request message is received from the wireless terminal, the BS related to the second SIM card registers the CFU information for the second SIM card,
   if a call request to the second SIM card is received, the BS related to the second SIM card requests the BS related to the first SIM card using information regarding the first SIM card included in the CFU information, and
   if an incoming call forwarding registration release request message is received from the wireless terminal, the BS related to the second SIM card releases the CFU information registration for the second SIM card.

6. The system of claim 1, wherein, if a call request through the second SIM card is received from the first terminal while the wireless terminal is performing a call with the second terminal through the first SIM card, the BS related to the first SIM card transmits a voice signal received from the BS related to the second SIM card to the wireless terminal.

7. A method of receiving a call in a wireless terminal including a single Radio Frequency (RF) device and a first Subscriber Identity Module (SIM) card and a second SIM card, the method comprising:
   if an incoming call request for the second SIM card is received to by a Base Station (BS) related to the second SIM card while the wireless terminal is performing a call through the first SIM card, requesting, by the BS related to the second SIM card, a Base Station (BS) related to the first SIM card for paging to the second SIM card;
   if the paging request for the second SIM card is received by the BS related to the first SIM card, informing, by the BS related to the first SIM card, the wireless terminal, of the incoming call request for the second SIM card while the wireless terminal is performing the call through the first SIM card;
   if both of the call ends in the wireless terminal, transmitting, by the wireless terminal, an incoming call forwarding registration release request message to the BS related to the second SIM card; and
   if the incoming call forwarding registration release request message is received from the wireless terminal, releasing, by the BS related to the second SIM card, a registration of the incoming call forwarding to the second SIM card.

8. The method of claim 7, wherein the requesting for the second SIM card comprises:
   if a call is requested in a state where the first SIM card is activated, requesting, by the wireless terminal, the BS related to the first SIM card for the call and simultaneously requesting the BS related to the second SIM card for registration of incoming call forwarding;
   registering, by the BS related to the second SIM card, incoming call forwarding for the second SIM card; and
   if a call request to the second SIM card is received, requesting, by the BS related to the second SIM card, the BS related to the first SIM card based on the registration of the incoming call forwarding.

9. The method of claim 8, further comprising transmitting, by the wireless terminal, Call Forwarding Unconditional (CFU) information in which information regarding the first SIM card is included and a CFU registration request message to the BS related to the second SIM card in order to register incoming call forwarding.

10. The method of claim 8, wherein, if the call request to the second SIM card is received, extracting, by the BS related to the second SIM card, information regarding the first SIM card from CFU information registered for the incoming call forwarding; and requesting the BS related to the first SIM card based on the extracted information regarding the first SIM card.

11. The method of claim 7, wherein the informing the incoming call comprises, if a paging request for the second SIM card is received from the BS related to the second SIM card, informing, by the BS related to the first SIM card, the wireless terminal performing the call of the incoming call through the second SIM card.

12. The method of claim 7, further comprising, if a call through the second SIM card is selected while the wireless terminal is performing a call through the first SIM card, holding off, by the wireless terminal, the call through the first SIM card and transmitting, by the BS related to the first SIM card, a voice signal received from the BS related to the second SIM card to the wireless terminal.

13. The method of claim 12, further comprising, if the call through the second SIM card occurs while the wireless terminal is performing the call through the first SIM card, transmitting, by the BS related to the first SIM card, a voice signal received from the BS related to the second SIM card to the wireless terminal.

14. A terminal for processing a call, the terminal comprising:
    a single Radio Frequency (RF) device for receiving an incoming call;
    a first Subscriber Identity Module (SIM) card and a second SIM card; and
    a controller configured to perform a call with a first terminal in communication with a first base station rebated to the first SIM card through the first SIM card and transmitting an incoming call forwarding pre-registration message to a second base station related to the second SIM card; and
    if an incoming call request for the second SIM card is received from the first base station while the terminal is performing the call with the first terminal through first SIM card, inform a user of the terminal of the incoming call request for the second SIM card,
    wherein the controller transmits an incoming call forwarding registration release request message to the second base station if both the calls ends.

15. The terminal of claim 14, wherein the controller transmits Call Forwarding Unconditional (CFU) information containing information of the first SIM card and a CFU registration request message to the second base station.

* * * * *

UNITED STATES PATENT AND TRADEMARK OFFICE
CERTIFICATE OF CORRECTION

PATENT NO.            : 9,185,547 B2                             Page 1 of 1
APPLICATION NO.       : 13/606437
DATED                 : November 10, 2015
INVENTOR(S)           : In-Hyung Jung et al.

It is certified that error appears in the above-identified patent and that said Letters Patent is hereby corrected as shown below:

In the Claims

Column 5, Claim 1, Lines 52-53 should read as follows:
--...card, wherein if both...--

Column 6, Claim 7, Line 43 should read as follows:
--...wireless terminal of the...--

Column 8, Claim 14, Line 12 should read as follows:
--...base station related to...--

Column 8, Claim 14, Lines 13-14 should read as follows:
--...card and transmit an...--

Column 8, Claim 14, Line 24 should read as follows:
--...both the calls end...--

Signed and Sealed this
Fifteenth Day of March, 2016

Michelle K. Lee
*Director of the United States Patent and Trademark Office*

UNITED STATES PATENT AND TRADEMARK OFFICE
CERTIFICATE OF CORRECTION

PATENT NO. : 9,185,547 B2  
APPLICATION NO. : 13/606437  
DATED : November 10, 2015  
INVENTOR(S) : In-Hyung Jung et al.

Page 1 of 1

It is certified that error appears in the above-identified patent and that said Letters Patent is hereby corrected as shown below:

In the Claims

Column 7, Claim 8, Line 1 should read as follows:  
--...related to the first SIM card.--

Signed and Sealed this  
Seventh Day of June, 2016

Michelle K. Lee  
*Director of the United States Patent and Trademark Office*